Dec. 27, 1949                  O. CESAREO                 2,492,356
RADIO OBJECT LOCATING TRAINING
DEVICE WITH ERROR INDICATION

Filed Dec. 6, 1943                                            5 Sheets-Sheet 1

INVENTOR
O. CESAREO
BY
ATTORNEY

INVENTOR
O. CESAREO
BY
M. R. McKenney
ATTORNEY

Dec. 27, 1949     O. CESAREO     2,492,356
RADIO OBJECT LOCATING TRAINING
DEVICE WITH ERROR INDICATION
Filed Dec. 6, 1943     5 Sheets-Sheet 4
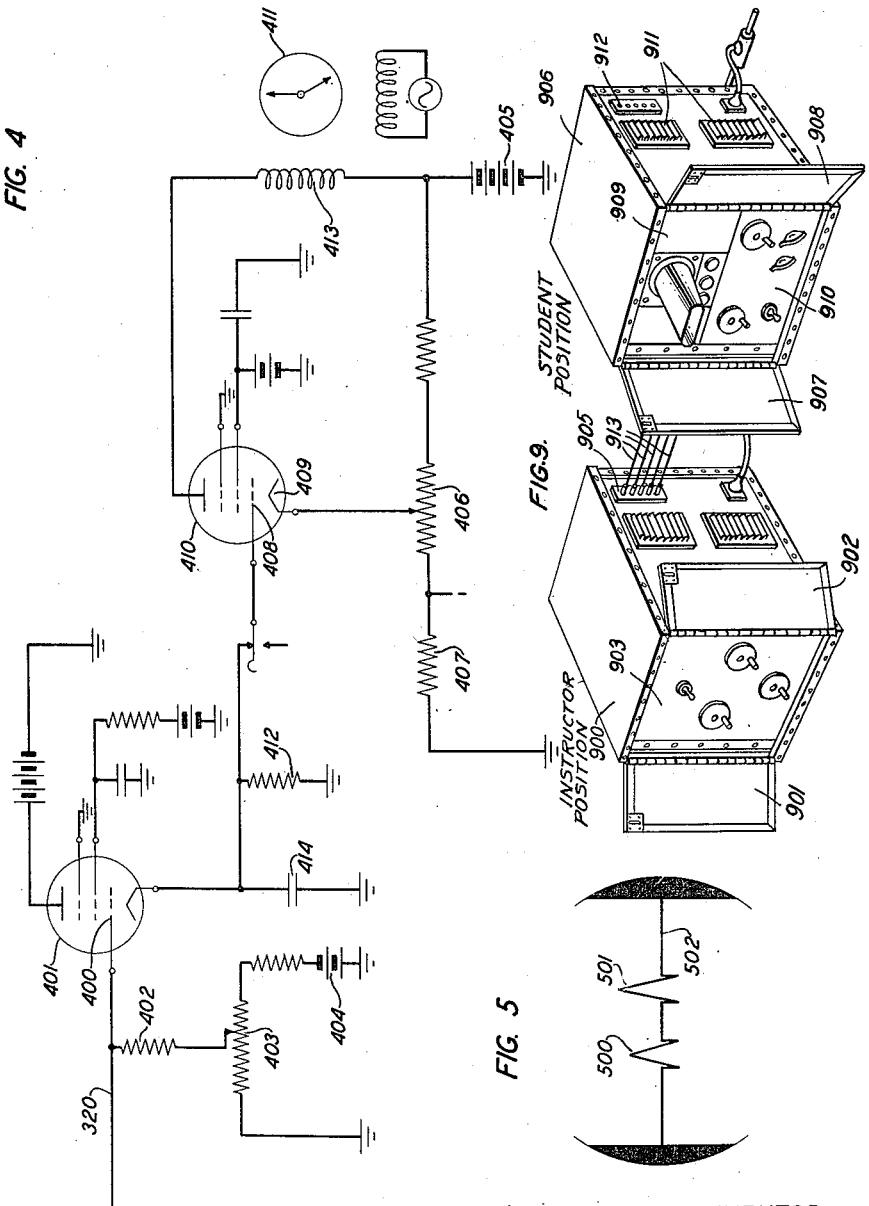
INVENTOR
O. CESAREO
BY
ATTORNEY Dec. 27, 1949     O. CESAREO     2,492,356
RADIO OBJECT LOCATING TRAINING
DEVICE WITH ERROR INDICATION Filed Dec. 6, 1943     5 Sheets-Sheet 5

INVENTOR
O. CESAREO
BY
ATTORNEY

Patented Dec. 27, 1949

2,492,356

UNITED STATES PATENT OFFICE 2,492,356

RADIO OBJECT LOCATING TRAINING DEVICE WITH ERROR INDICATION

Orfeo Cesareo, Washington Township, Bergen County, N. J., assignor to Bell Telephone Laboratories, Incorporated, New York, N. Y., a corporation of New York Application December 6, 1943, Serial No. 513,044

4 Claims. (Cl. 35—10.4)

This invention relates to signaling systems and apparatus and particularly to systems for training students in the art of locating distant objects.

Systems have been devised for determining the range and angular location of an airplane or other object moving at a variable speed in space. These locating systems make use of directive radio impulses which are transmitted from the point of observation to the moving airplane, from which they return as echo impulses. The returning impulses are received and utilized to form images on a screen before the operator, and the character and behavior of these images afford a continuous representation of the range and angular location of the moving airplane. The operator is also provided with adjustable means, such as hand wheels, which he manipulates to follow or otherwise control these changing images. Devices responsive to the operator's hand wheels as he follows or tracks the moving airplane provide the necessary information for training guns on the airplane as a target.

Training systems have also been devised for giving students a preliminary course of training in the art of manipulating the object locating systems. To this end the courses of imaginary airplanes are generated automatically in terms of varying electrical quantities representative of range and angular dimensions and these varying electrical quantities are used to produce images on a screen before the student corresponding to those which the operator observes when engaged in tracking a real airplane. The student is likewise provided with manually operable devices, such as hand wheels, which he manipulates to simulate the act of following the imaginary object. The illusion afforded by these training systems is quite effective, and prictice in manipulating them soon develops the student's skill. It has been recognized, however, that the usefulness of the training system would be largely enhanced by provision of some means for detecting and measuring the error of the students.

Objects of the invention, therefore, are to detect the presence of error on the part of the student in following the movement of an imaginary object in space; to establish varying standards in proficiency; to observe the student's error either when following the range or the angular location of the moving object; and in other respects to improve systems of this general character.

These and other objects of the invention are realized by means of a system in which the signals representing the location of the imaginary course being generated are compared with the signals which the student controls in his effort to follow the movement of the imaginary object. More specifically, the range and the angular dimensions of the imaginary course generated by the training system are represented by varying the phase of alternating waves taken from a base source. The student endeavors to follow either the range or the angular relation by introducing into said waves manually similar variations of phase, and the presence of error on the part of the student, either while tracking the range or the angular location of the imaginary object, is determined by comparing the phases of impulses derived from said waves. If at any instant the impulses derived from the wave controlled by the course generator are in phase with the impulses derived from the wave controlled by the student's phase shifter, these impulses add and the result is that the mechanism operates in a manner to indicate that the student is on the target. If, however, these impulses do not occur concurrently, the student is in error, and the mechanism so indicates.

With this arrangement it is possible to require the students to demonstrate varying degrees of proficiency in order to be free from error. For beginners a low proficiency is required, and this is achieved by increasing the time duration of either one or both of the matching impulses. The longer the impulse the more latitude the student has in the manipulation of his tracking mechanism. On the other hand the more skilled students are subjected to a higher standard by shortening the length of the impulses wich they must bring into synchronism in order to prevent the mechanism from recording error against them.

The foregoing and other features of the invention will be discussed more fully in the following detailed specification.

In the drawings accompanying the specification:

Figs. 1, 2, 3 and 4, when arranged in order constitute a diagram of a training system incorporating the features of the invention;

Figure 3:
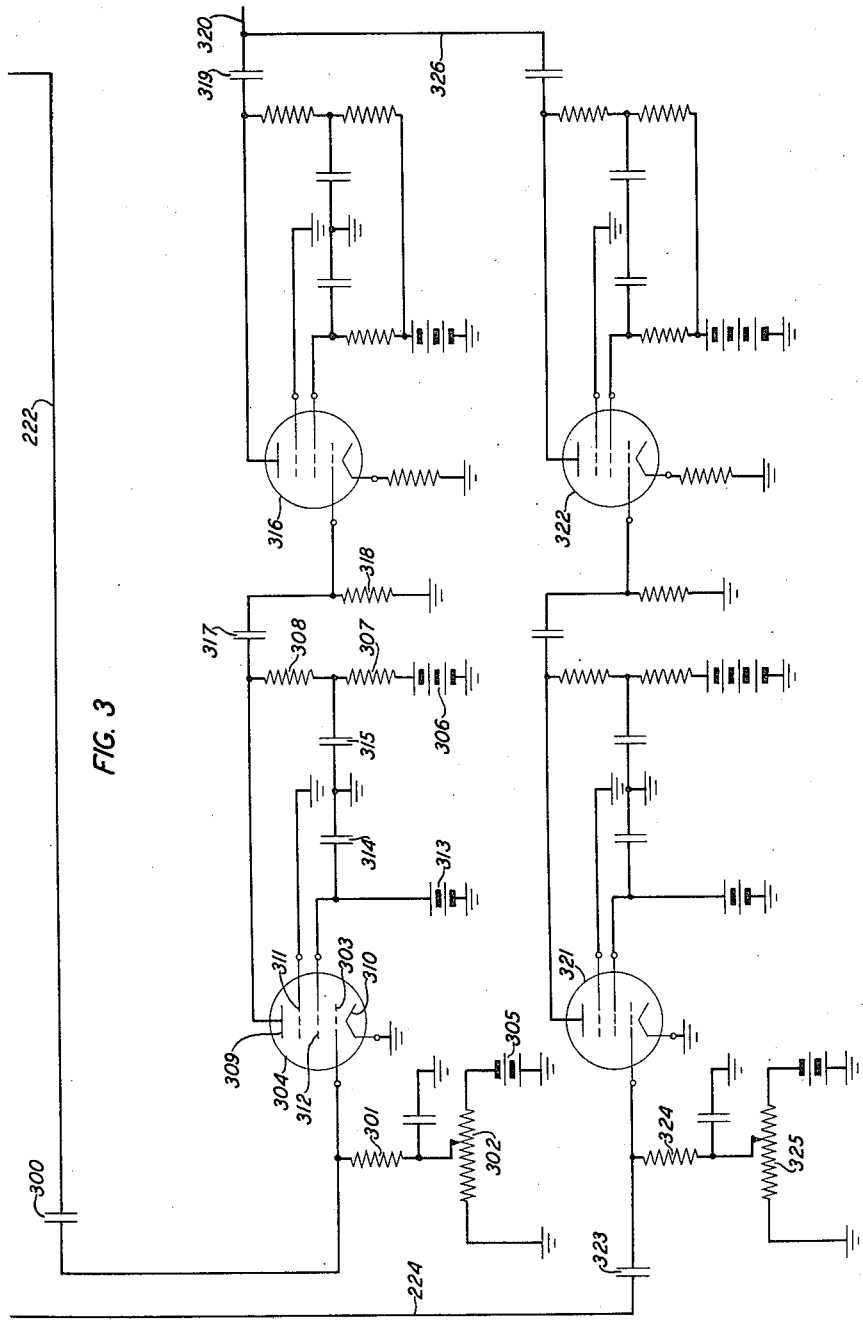
Figure 6:
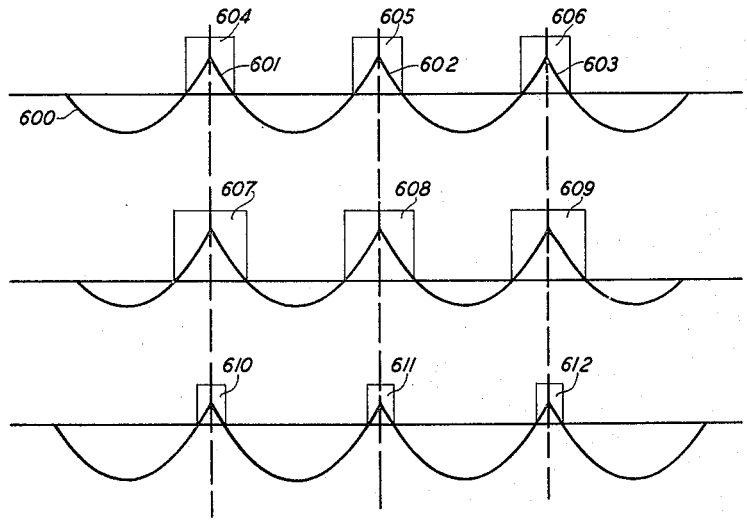
Figure 7:
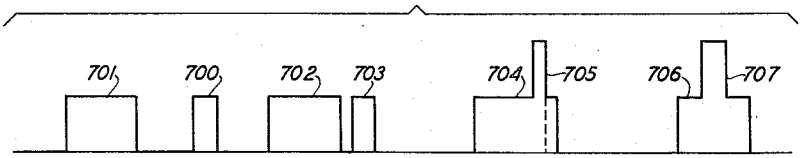
Figure 8:
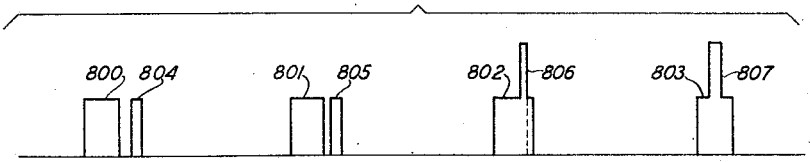

Figs. 3 and 4 disclose the circuits and apparatus for detecting and indicating the student's error;

Fig. 5 is a fragmentary view illustrating the azimuth images on the oscilloscope screen;

Figs. 6, 7 and 8 are diagrams illustrating the formation and matching of impulses for detecting the student's error; and Fig. 9 illustrates the instructor's apparatus cabinet and one student's apparatus cabinet as they would be set up for training purposes.

The three dimensions of primary interest in the location of a moving object, such as an airplane, are range, azimuth angle, and elevation angle; and the first requirement of a training system for students is to generate in terms of suitable electrical quantities artificial or imaginary courses of flight in which these range and angular dimensions vary in the desired manner. In the copending application of Andrews and Cesareo, Serial No. 513,042, filed December 6, 1943, which issued April 6, 1948, as Patent No. 2,438,888, a training system is disclosed in which straight-line courses are generated having varying values of range and azimuth angle, in which images are formed on the student's oscilloscope representing the varying range and azimuth angle, and in which the student is provided with means which he can manipulate to track or follow either the range or the azimuth angle of the imaginary object moving along the simulated course. In this Andrews and Cesareo patent the instant values of the range and azimuth angle are represented on the oscilloscope screen by means of triangular shaped images or pips. One of these images moves on the screen with respect to a stationary notch, also formed thereon, and the student tracks the range of the imaginary object by manipulating his devices to hold the image pip located in the stationary notch. The azimuth angle on the other hand is represented on the oscilloscope screen by means of a pair of these triangular shaped images which are located in the center of the screen in associated notches. Although these image pips remain stationary throughout the generation of the imaginary course, they vary in their altitude in accordance with variations in the azimuth angle of the imaginary object, and the student endeavors to manipulate his control device in such a manner as to maintain these images at equal altitudes. As long as he is able to do this, he is accurately following the azimuth angle of the imaginary object.

In the system of the present invention the accuracy with which the student manipulates his control device either while following the range or the azimuth angle is under constant surveillance by circuit means which compares the phases of the waves utilized in the formation and control of the images on the oscilloscope screen and from these comparisons determines and records all errors made. For a better understanding of the system reference is now made to the drawings.

The apparatus at the instructor's position is mounted in an apparatus cabinet 900, shown in Fig. 9, having front closure doors 901 and 902 and a control panel 903. The sides of the cabinet are provided with ventilation slots 904 and with cable jacks, such as 905, by which the cabinet may be connected with one or more students' positions. The apparatus at a student's position is mounted in an apparatus cabinet 906, shown in Fig. 9, having front closure doors 907 and 908, a panel 909 on which an oscilloscope and controls therefor are mounted, and a control panel 910. The sides of the cabinet are provided with ventilation slots 911 and with cable jacks, such as 912, by which the cabinet may be connected by plug-ended cables 913 with the instructor's apparatus cabinet 900 and with other student's cabinets similar to cabinet 906.

Figure 1:
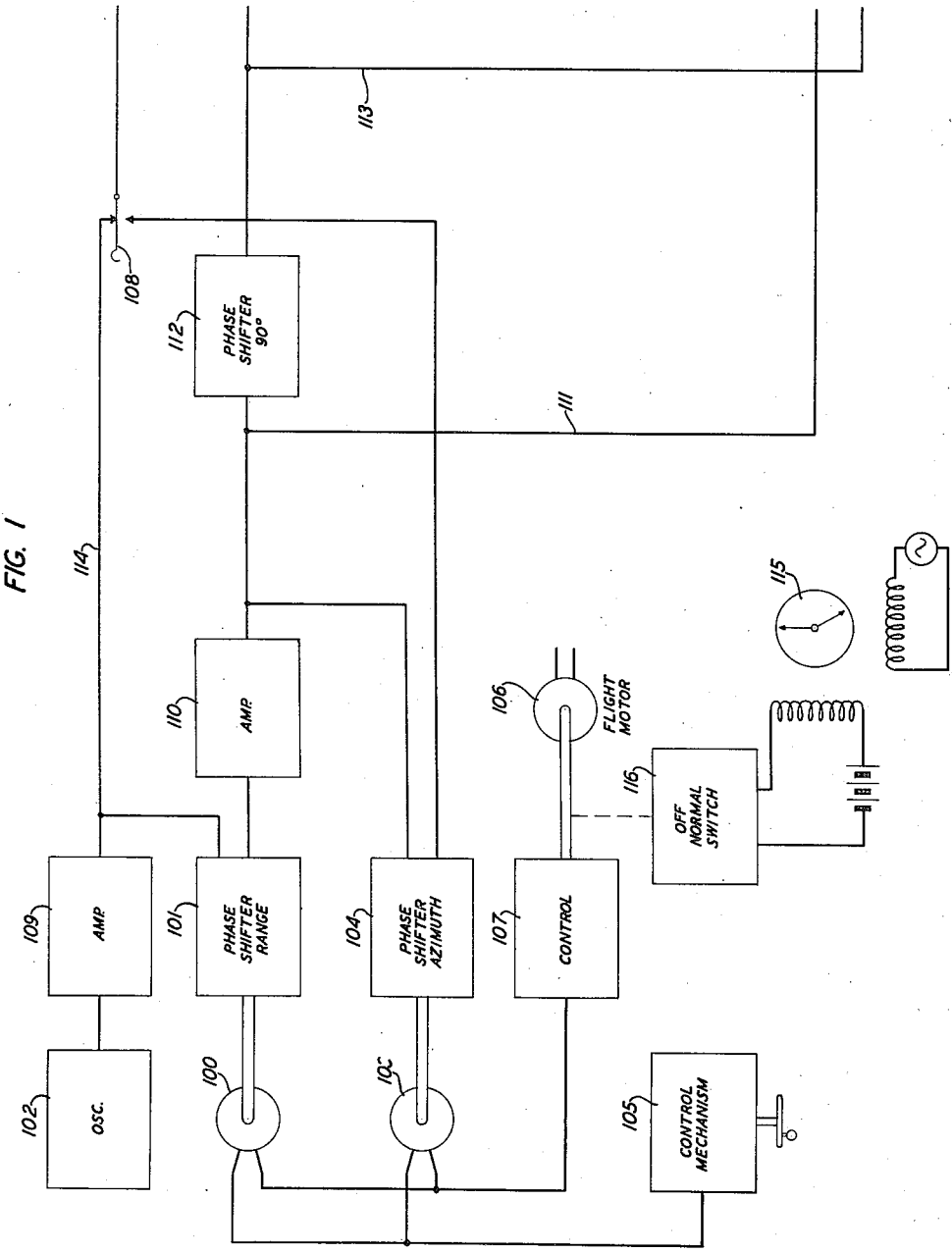
Fig. 1 shows a part of the course generating equipment associated with the instructor's position.
Figure 2:
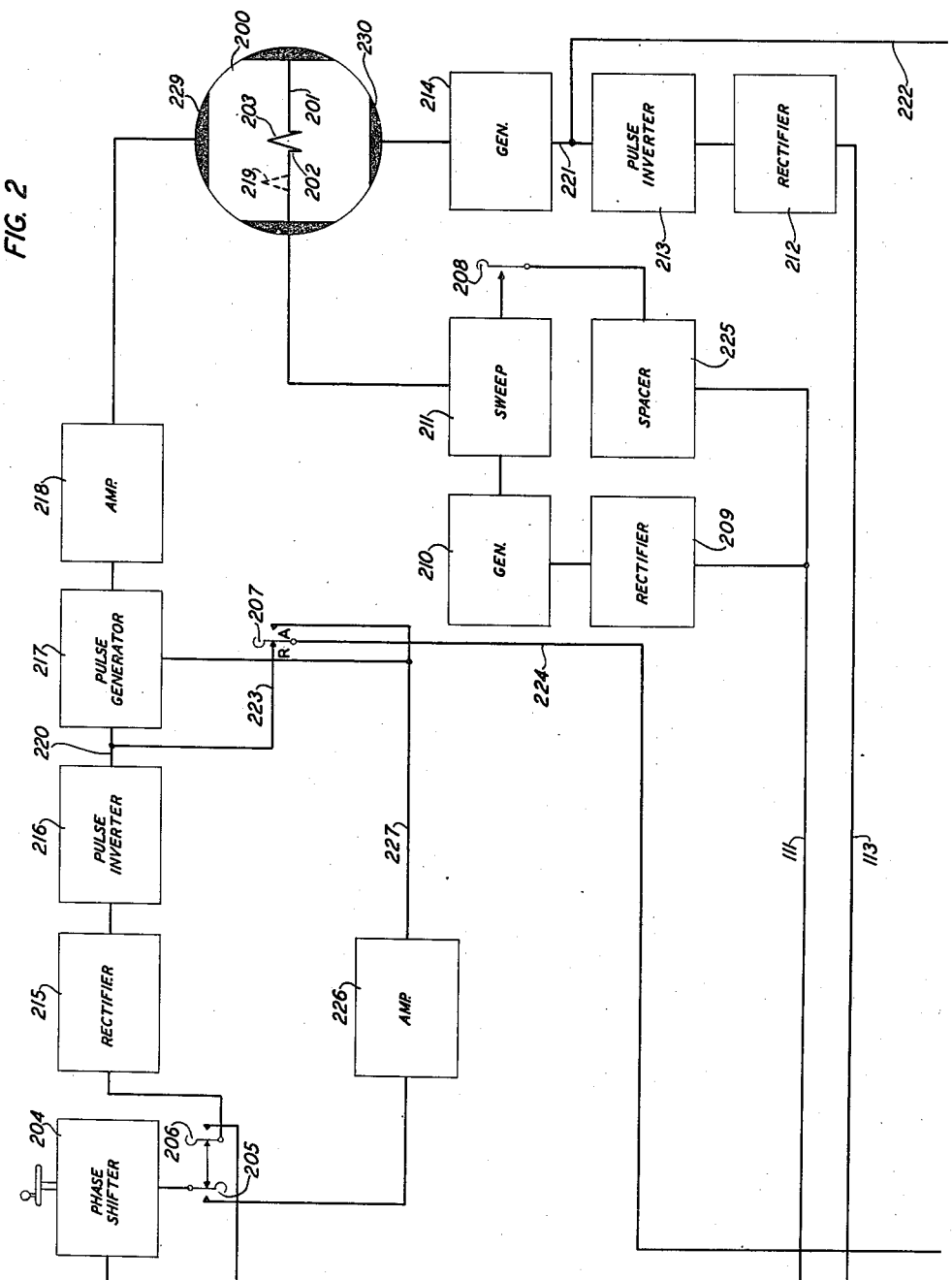
Fig. 2 illustrates the equipment associated with a student's position, including the student's phase shifter and the oscilloscope in which he observes the moving images.

The flight generator, which is only partially disclosed in Fig. 1, may be of the same type as the one shown and described in detail in the copending application of D. H. Pennoyer, Serial No. 513,076, filed December 6, 1943, which issued April 6, 1948, as Patent No. 2,438,940. It includes a motor 100 for driving a range phase shifter 101 which introduces into an alternating wave taken from the base source 102 a change of phase, the instant value of which represents the range of the object with respect to the point of reference. It also includes a motor 103 for driving the azimuth phase shifter 104 which introduce into a wave taken from the output circuit of phase shifter 101 a change of phase, the instant value of which represents the azimuth angle of the imaginary object. The course generator also includes suitable control mechanism 105, by which the instructor can preselect the desired course to be generated, and a flight motor 106 and associated control circuits for driving and controlling the generating mechanism after the instructor has made the desired setting.

Each student's position is equipped with an oscilloscope 200 having a luminescent screen on which a horizontal trace 201 is formed with a stationary center notch 202 therein and having a movable image pip 203 which represents the range of the imaginary object. While the student is tracking the range of the imaginary object, he endeavors to manipulate his phase shifter 204 to control in such a manner the phase of the wave forming the image pip 203 that the pip rests accurately in the notch 202. If, on the other hand, it is desired to have the student follow the azimuth angle the keys 108, 205, 206, 207 and 208, all of which may be controlled by a single lever or button at the instructor's position are moved to their alternate circuit positions; and the student now observes a pair of image pips 500, 501 (Fig. 5) located in corresponding notches in the horizontal trace 502 which vary in their relative altitudes in accordance with the varying azimuth angle of the imaginary object in space. To trace the azimuth angle, therefore, he similarly manipulates his phase shifter 204 in an effort to maintain the images 500 and 501 at equal altitudes.

The student's position is also equipped with a clock 411 and associated operating circuits for indicating the total time during the period of flight that the student is free from error in the manipulation of his tracking devices. In other words, as long as the student is on the target either with respect to range or azimuth the clock 411 runs. By comparing the reading of the student's clock 411 at the end of a flight with the reading of a standard clock 115 at the instructor's position, which runs continuously from the beginning to the end of the flight, the total error time chargeable against the student may be calculated.

Examining the circuits of the system more closely and assuming for the moment that the keys are in the positions shown, namely the positions for range tracking, it will be noted that a wave of the base phase and frequency from the source 102, after undergoing amplification by a suitable amplifier 109, is applied to the phase shifter 101 of the course generator. The resulting phase-shifted wave in the output circuit of shifter 101 is amplified by amplifier 110 and is then conducted over circuit 111 to the rectifier 209. The pulses resulting from the rectified wave are utilized by pulse generating and sweep control circuits 210, 211 of well-known types to control the beam of the oscilloscope 200 to form the horizontal trace 201 in synchronism with the phase-shifted wave. At the same time a wave from the output of the phase shifter 101 is subjected to a constant shift of 90 degrees by a suitable circuit 112 and is then applied over conductor 113 to the rectifier 212. The resulting rectified impulses are applied to a pulse inverter 213, and the inverted impulses are utilized by an impulse generating circuit 214 to produce the notch 202 in the horizontal trace 201. In view of the 90-degree relation between the phases of the wave which produces the trace and the wave which produces the notch this notch will remain stationary on the screen and will be located in the center thereof.

Also a wave taken from the base source 102 is applied over conductor 114 through the contacts of key 108 to the student's phase shifter 204. The output wave from the phase shifter 204 is applied over the circuit through keys 205 and 206 to the impulse rectifier 215. The impulses after rectification are inverted by means of a suitable pulse inverter 216 and are then applied to the impulse generating and shaping circuit 217. The output impulses from the circuit 217 are amplified by a suitable amplifier 218 and are then applied to the vertical deflection plates 229 and 230 of the oscilloscope 200. Neglecting the effect of the student's phase shifter 204 it will be seen that the impulses applied to the vertical plates of the oscilloscope 200 are in phase with the original source 102; therefore, the image pip 203 which is formed by these impulses in the horizontal trace 201 will appear to move across the screen in accordance with the changing phase introduced by the range phase shifter 101. Noting the movement of the image pip 203 and its location, such as that indicated by the dotted pip 219, the student manipulates the phase shifter 204 to introduce into the wave that forms the pip 203 a phase change which is just sufficient to advance the pip into juxtaposition with the notch 202 and to hold it there.

For each instant that the student is able to hold the pip 203 centered in the notch 202 the impulses appearing in conductor 220 are exactly in phase with the impulses appearing in conductor 221. This is true because the impulses in conductor 220 are those which form the image 203 and the impulses in conductor 221 are those which form notch 202. Therefore, a comparison of the phases of these impulses shows no phase difference, and this fact may be taken as an indication that the student is not making any error. Such a comparison is made by the circuits shown in Figs. 3 and 4.

The alternating wave in circuit 113, after being rectified and inverted by the rectifier and inverter circuits 212 and 213, has the appearance illustrated in Fig. 6. By properly choosing the bias of the tubes used in the inverter circuit, the rectified wave 600 is clipped and only the impulses 601, 602, 603, etc., appearing above the axis are permitted to flow into the circuit 221. As explained above, these impulses are applied to the generator 214, which shapes them and utilizes them to form the notch in the trace 201. These impulses are also applied over circuit 222 through condenser 300, resistor 301, through the potentiometer resistor 302 to ground. It will be noted that the control grid 303 of the pulse forming tube 304 is normally biased negatively by the battery 305, the extent of the bias depending upon the position of the potentiometer contact. When, therefore, the positive impulses 601, 602, 603, etc., which are in exact synchronism with the impulses forming the reference notch 202 on the screen, are applied to the grid element 303, they oppose the normal bias, and the tube 304 conducts. The function of the tube 304 is to reform the sharp impulses received over circuit 222 and to give them a square shape as indicated by the impulses 604, 605, 606, etc. Since the width of the reformed impulse 604 is determined by the conducting time of the tube 304, the bias applied to the control grid 303 may be utilized to vary the width of the impulse. The impulses arriving over circuit 222 are of uniform width, and for a given bias on the grid 303 the impulses in the output circuit of the tube 304 will have a fixed width, such as that illustrated for the impulses 604, 605, 606, etc. To increase the width of the reshaped impulses it is only necessary to adjust the potentiometer 302 to decrease the negative bias on the grid 303. Decreasing the negative bias increases the time during which the tube 304 conducts for each successive impulse, thereby increasing the width of the reformed impulses 607, 608, 609, etc. If on the other hand it is desired to decrease the width of the reformed impulses, the negative bias is increased to reduce the conducting time for each impulse, and the result is that the reshaped impulses 610, 611, 612, etc., are reduced in width correspondingly. The anode-cathode circuit for the tube 304, in which the reshaped impulses appear, may be traced from the positive pole of battery 306, resistors 307 and 308, anode 309, cathode 310 to ground. The suppressor grid 311 is connected directly to ground, and the screen grid 312 is maintained at a positive potential by the battery 313. The condensers 314 and 315 are inserted for filtering purposes. While a considerable squaring effect is obtained with the single tube 304, this effect may be enhanced by adding a second stage of shaping, and this is done by means of the succeeding tube 316. The impulses in the output circuit of tube 304 are applied through condenser 317 to the resistor 318 for effecting correspondingly the control grid of the tube 316. The finally shaped impulses in the anode circuit of the tube 316 are applied through condenser 319 to the circuit 320.

Concurrently with the formation of these square-topped impulses in phase with the impulses which form the reference notch 202 on the screen, similar pulses are formed by the tubes 321 and 322 in phase with the impulses which, under the control of the student's phase shifter 204, cause the formation of the range image pip 203. To this end the inverted impulses in the output circuit of inverter 216 are conducted over circuit 223 through the key 207, conductor 224, through condenser 323 and resistor 324 to the potentiometer 325. These impulses are applied to tube 321 which partially shapes them, and the output impulses from this tube are applied to the second tube 322 which completes the shaping operation and delivers to the conductor 320 by way of conductor 326 square-topped impulses in phase with the impulses forming the image pip 203. By similarly controlling the negative bias applied to the control grid of the tube 321 with the necessary adjustment of the potentiometer 325 it is possible to select any desired width for the impulses flowing over the circuit 326 to the common circuit 320.

The common conductor 320 is connected to the control grid 400 of tube 401 and through resistor 402 to the potentiometer 403. The potentiometer 403 is set to apply to the control grid 400 a normal negative bias from the battery 404 which is sufficient to prevent the tube 401 from conducting when positive impulses are delivered to conductor 320 from either one alone of the tubes 316 and 322. For example, if the student is in substantial error in his effort to follow the range of the imaginary object, meaning that the image pip 203 is out of the notch 202 on one side or the other, the impulses 700 (Fig. 7), which are formed by tubes 321 and 322 in phase with the impulses which form the image pip 203, are substantially out of phase with the impulses 701 formed by the tubes 304 and 316 in phase with the impulses that form the reference notch 202. Therefore, these positive impulses 700 and 701 are applied to the grid 400 sequentially and do not reduce its bias sufficiently to permit tube 401 to conduct. As long as the tube 401 is non-conducting the negative bias applied from battery 405 through resistors 406 and 407 to the circuit of the control grid 408 and cathode 409 prevents the tube 410 from conducting. Therefore the clock 411 fails to run, indicating that the student is in error at this time.

As the student brings the image pip 203 back toward the notch 202 the error detecting impulses 702 and 703 approach each other until finally, as the error is minimized, these impulses coincide in point of time, as indicated by the superimposed impulses 704—705 and 706—707. Since these impulses are now concurrent in time, they add in the circuit 320, the tube 401 conducts, and current flowing in the resistor 412 decreases the negative bias on tube 410 permitting this tube also to conduct. Current flowing from the battery 405 through the operating coil 413 and the anode and cathode of the tube 410 causes the clock 411 to operate to record the accurate manipulation by the student. The condenser 414 is included in the cathode circuit of tube 401 and assumes a charge in response to a succession of conducting intervals by the tube. The condenser 414 and the resistor 412 are suitably proportioned to enable the tube 410 to respond accurately to the matching impulses delivered to the input circuit of the tube 401.

From the foregoing it will be seen that the student is considered to be in error at all times when the impulses applied from tubes 316 and 322 to the common conductor 320 do not overlap and add to each other, and during these times the error recording clock 411 fails to run. Since, therefore, the student is considered to be free from error or on the target at all times when these impulses are sufficiently in phase to overlap and add to each other, it is possible by varying the width of the image impulses to increase or decrease at will the degree of accuracy with which the student must manipulate the tracking mechanism in order to keep himself free from error. This method of varying the standard of proficiency is clearly illustrated in Figs. 7 and 8. If, for example, a student is a beginner, he may be given the benefit of a lower standard by adjusting the potentiometer 302 for the maximum width impulses 701, 702, 704, 706, etc., in the output circuit of the tube 316. These impulses, being of maximum width, make it that much easier for the student to bring the impulses in the output circuit of tube 322 into overlapping relation therewith. This overlapping relation is illustrated in the last two positions of Fig. 7. In the first of these positions the impulse 705 controlled by the student's phase shifter 204 is shown overlapping the edge of the pedestal impulse 704 but the overlapping portions add to each other, giving a total voltage sufficient to operate the tube 401 and cause the clock 411 to run. This would correspond to a rough registration of the image pip 203 with the notch 202 as distinguished from an accurate centering of the pip in the notch. In the last position of Fig. 7 the student's impulse 707 is seen to be more closely in phase with the pedestal impulse 706, and, as before, the clock 411 is caused to run to credit the student with on-target operation. Thus, if the student is able to maintain any substantial portion of his impulse in an overlapping relation with any portion of the wide pedestal impulses he is able to keep the clock running. On the other hand, the more skilled student should be subjected to a higher standard of proficiency, and this may be accomplished by varying the bias on the tube 304 to reduce the pedestal impulses 800, 801, 802, 803, etc., to their minimum width. In this case it will be more difficult for the student to maintain the matching impulses 804, 805, 806, 807, etc., which he controls, in an overlapping or adding relation with the pedestal impulses.

It will be understood, of course, that the standards of proficiency above described may be controlled either by varying the width of the pedestal impulses with the potentiometer 302 or by varying the width of the student controlled impulses with the potentiometer 325 or by varying the width of both of these impulses.

At the commencement of the imaginary flight, the azimuth of which the student is tracking as above described, the off-normal switch 116 is operated in any suitable manner by the flight motor 106 to close an energizing circuit for the standard clock 115. This clock runs continuously throughout the period of the flight and is stopped at the end of the flight by any suitable means for opening the switch 116. A comparison, therefore, between the total time of the flight indicated by the clock 115 and the total time of accurate tracking recorded by the student's clock 411 affords a rating of the student's skill.

When the instructor wishes to test the student's skill in azimuth tracking the keys 108, 205, 206, 207 and 208 are shifted to their alternate positions. In this case waves are applied over circuits 111 and 113 to the impulse rectifiers 209 and 212 and cause as before the formation on the oscilloscope screen of a persistent trace 201 having a center notch therein. However, the key 208 is now closed to render the image spacing mechanism 225 effective, and the result is that alternate sweeps of the oscilloscope beam are spaced to give the effect of two notches instead of one located side by side in the central portion of the screen, as seen in Fig. 5. Furthermore, the key 206, now being in its alternate position, a wave taken from the output circuit of the phase shifting device 112 is applied to the impulse rectifier 215. The resulting impulses, after being inverted, shaped and suitably amplified, are applied to the vertical plates of the oscilloscope to form at each sweep of the beam an image pip which is accurately located within the concurrently formed notch, resulting therefore in the appearance of two image pips 500 and 501 on the screen of the oscilloscope. One method by which these images are spaced is disclosed in detail in the above-noted Patent No. 2,438,888 of Andrews and Cesareo.

The two image pips 500 and 501 thus formed side by side on the screen from the wave taken from the output circuit of amplifier 110 will, unless subjected to the influence of the course generator, remain at equal amplitudes. However, it is the relative change in the amplitudes of these images that denotes to the student the changing azimuth angle of the imaginary object which he is supposed to follow. To effect this change a wave taken from the output circuit of the amplifier 110 is applied to the azimuth phase shifter 104 of the course generator which introduces therein a change of phase representative of the changing azimuth angle of the imaginary object. The output from the phase shifter 104 is now applied through the contacts of key 108 to the student's phase shifter 204, and the output wave from the student's phase shifter 204 is applied over the contacts of key 205 to the amplifier 226 from whence it is applied over conductor 227 to the pulse generator circuit 217. If the wave thus applied from the amplifier 226 to the pulse generator 217 is exactly in phase with the wave applied to the generator over conductor 220, it does not affect the impulses which produce the image pips 500 and 501. However, if the wave applied over conductor 227 is not in phase, indicating that the student is not tracking the azimuth angle accurately, it reacts on the pulse generator circuit 217 causing one of the image pips 500—501 to increase its altitude and the other to decrease its altitude. The manner in which this phase difference affects the pulse generator 217 is disclosed in detail in applicant's copending application Serial No. 513,043, filed December 6, 1943, which issued as Patent No. 2,453,-743 on November 16, 1948.

From the foregoing explanation of the manner in which the azimuth angle is followed by controlling the altitudes of the images 500 and 501 on the screen it will appear that the student's error in following the azimuth angle may be detected by making the same comparison, described in connection with range tracking, between the phases of the impulses appearing in conductor 221 and the phase of the impulses appearing in conductor 227. The impulses in conductor 221 are, as before, delivered over conductor 222 to the tubes 304 and 316, and in the present case, the key 207 being operated, the impulses in conductor 227 are delivered by way of conductor 224 to the tubes 321 and 322. It follows, therefore, that the clock 411 will run at all times when the impulses formed in the output circuit of tube 316 are in overlapping relation with those formed in the output circuit of tube 322 and will remain quiet at all times when these impulses are not in overlapping relation. As the development of the course proceeds the student manipulates his phase shifter 204 endeavoring to maintain the image pips 500 and 501 at equal altitudes, and as long as he is able to achieve this result within the limits of the proficiency standard assigned to him the clock 411 continues to run to credit him with accurate tracking. In this case, too, the standard of proficiency may be varied by varying the width of one or the other or of both sets of image impulses.

What is claimed is:

1. In apparatus for training in locating the course of an object moving in space the combination of a screen visible to the operator of said apparatus, a source of alternating current, means for utilizing waves from said source to form on said screen images which vary in accordance with a dimension of said moving object with respect to a point of reference, said images serving to guide the operator in following said object, tracking means manipulated by the operator for controlling the relationship of said images in his effort to follow said dimension, error indicating means effective whenever the operator fails to manipulate said tracking means with sufficient accuracy to follow said dimension, and means for varying the degree of accuracy required of the operator to prevent said error indicating means from becoming effective.

2. In a training device having means responsive to waves from a source of alternating current for electrically simulating images corresponding to the changes in position of an artificial target, said images serving to guide an operator in following said target, tracking simulating means manipulated by the operator for shifting the phase of one of said waves, a first electronic means responsive to one of said waves, a second electronic means responsive to the other of said waves the phase of which has been shifted by the operator, other electronic means responsive to the outputs of said first and said second electronic means during intervals when the phases of their outputs match as a result of no error of the operator in following the target, and means controlled by said latter electronic means for indicating the total duration of said intervals.

3. In a training device having means responsive to waves from a source of alternating current for electrically simulating images corresponding to the changes in position of an artificial target, said images serving to guide an operator in following said target, tracking simulating means manipulated by the operator for shifting the phase of one of said waves, a first electronic means responsive to one of said waves, a second electonic means responsive to the other of said waves the phase of which has been shifted by the operator, other electronic means responsive to the outputs of said first and said second electronic means during intervals when the phases of the impulses of their outputs match as a result of no error of the operator in following the target, means controlled by said latter electronic means for indicating the total duration of said intervals, and means for changing the response of either one of said first or second electronic means for varying at will the time duration of the impulses of its output to vary accordingly the accuracy required of the operator to be free of error.

4. In a training device having means responsive to waves from a source of alternating current for electrically simulating images corresponding to the changes in position of an artificial target, said images serving to guide an operator in following said target, tracking simulating means manipulated by the operator for shifting the phase of one of said waves, a first electronic means for deriving a first series of square-topped impulses from one of said waves, a second electronic means for deriving a second series of square-topped waves from the other of said waves the phase of which has been shifted by the operator, other electronic means for matching the phases of the impulses of said two series to determine whether or not the operator is in error, means controlled by said latter means to indicate the total of the intervals when the operator does not err in the manipulation of said phase shifting means in following the target with the required accuracy, and means for changing at will the time duration of the impulses of either one of said series to vary accordingly the accuracy required of the operator to be free of error.

ORFEO CESAREO.

REFERENCES CITED

The following references are of record in the file of this patent:

UNITED STATES PATENTS

| Number | Name | Date |
|---|---|---|
| 1,939,706 | Karnes | Dec. 19, 1933 |
| 2,321,799 | Cone | June 15, 1943 |
| 2,399,661 | Bowie | May 7, 1946 |